UNITED STATES PATENT OFFICE.

FRITZ ACH, OF MANNHEIM, GERMANY, ASSIGNOR TO C. F. BOEHRINGER & SOEHNE, OF WALDHOF, NEAR MANNHEIM, GERMANY.

PROCESS OF OBTAINING VANILLIN.

SPECIFICATION forming part of Letters Patent No. 561,077, dated June 2, 1896.

Application filed November 30, 1895. Serial No. 570,659. (No specimens.)

*To all whom it may concern:*

Be it known that I, FRITZ ACH, a citizen of the German Empire, residing at Mannheim, Grand Duchy of Baden, Germany, have invented certain new and useful Improvements in the Art of Preparing Vanillin; and I do hereby declare the following to be a full, clear, and exact description of the invention, such as will enable others skilled in the art to which it appertains to make and use the same.

This invention relates to the art of preparing vanillin, and more particularly to the method of splitting up a vanillin ether, such as vanillin benzyl ether, for the purpose of obtaining the vanillin.

In United States Letters Patent No. 487,204, dated November 29, 1892, a method has been set forth and claimed which consists in splitting up a vanillin ether of the type vanillin benzyl ether ($C_6H_3.COH.OCH_3.OCH_2.C_6H_5$) by means of an acid. This reaction, when hydrochloric acid is employed, proceeds according to the following equation:

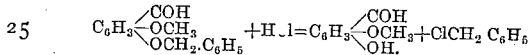

From this equation it appears that under this method one molecule of the vanillin ether requires one molecule of the hydrochloric acid to complete the reaction. The same would be true if other halogen acids (hydrobromic or hydroiodic acid) were employed. Where dilute hydrochloric or other acids are employed, the decomposition must, however, be carried out with a large excess of the acid.

It is the object of the present invention to obviate the necessity for using large quantities of acids in preparing the vanillin by the decomposition of the vanillin ethers; and for this purpose the same consists in the methods, steps, and features described in the specification and pointed out in the claims, whereby a small quantity of acid may be used over and over again for such decomposition.

I have found that the decomposition of the vanillin ethers, particularly of the type of vanillin benzyl ether, may be carried out with a very small quantity of acid, such as hydrochloric, hydrobromic, or hydroiodic acid, when it occurs in the presence of an alcohol—such, for example, as methyl, ethyl, or amyl alcohol. Under these conditions the aromatic halogen-alkyl compound (*e.g.*, benzyl chlorid) is by the alcohol resolved into benzyl ether (*e.g.*, benzyl methyl, ethyl, or amyl ether) and the acid with which the process was begun, which will thus be used to decompose further quantities of vanillin benzyl ether, (or benzyl-vanillin,) and so on.

The reaction occurring takes place in two phases or steps, which are expressed in the following equations:

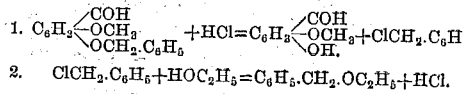

2. $ClCH_2.C_6H_5 + HOC_2H_5 = C_6H_5.CH_2.OC_2H_5 + HCl.$

I preferably proceed as follows when splitting up the vanillin ether with twenty per cent. of the theoretically-required quantity of hydrochloric acid: Four kilograms vanillin benzyl ether, together with six kilograms ethyl alcohol, three liters water, and three hundred and thirty grams hydrochloric acid of the specific gravity 1.19 are kept heated from four to six hours at 100° centigrade in a digester while constantly stirring. The alcohol distils over and the benzyl-ethyl ether is carried over with the steam generated. The vanillin contained in the residue is isolated according to well-known methods. In this example the hydrochloric acid may be replaced by other acids, such as hydrobromic or hydroiodic acid, and the ethyl alcohol by other alcohols, such as methyl or amyl alcohol, &c. Thus the vanillin ethers of the type of benzyl-vanillin may be split up into vanillin and the corresponding benzyl ethers by means of small quantities of sulfuric acid in the presence of an alcohol, such as methyl, ethyl, or amyl alcohol.

In this case I prefer to proceed according to the following example: Four kilograms vanillin benzyl ether, together with eight kilograms alcohol, four liters water, and four hundred grams concentrated sulfuric acid are kept heated at from 100° to 110° centigrade in a digester. After distilling off the alcohol and driving over of the benzyl-ethyl ether, which is formed by means of steam, the vanillin remaining is separated and purified according to well-known methods.

What I claim, and desire to secure by Letters Patent, is—

1. The method of decomposing a vanillin ether, which consists in treating the same with an acid in the presence of an alcohol, whereby such decomposition may be effected by only a small quantity of acid.

2. The method of decomposing a vanillin ether, which consists in heating the same in a digester with an acid, an alcohol and water, substantially as set forth.

3. The method of obtaining vanillin, which consists in treating vanillin benzyl ether with an acid in the presence of an alcohol, substantially as set forth.

4. The method of obtaining vanillin, which consists in heating vanillin benzyl ether with an acid and water in the presence of alcohol, substantially as set forth.

5. The method of obtaining vanillin, which consists in heating vanillin benzyl ether with hydrochloric acid, alcohol and water in a digester until complete decomposition occurs, then distilling off the alcohol and driving off the resulting benzyl-ethyl ether, substantially as set forth.

6. The method of obtaining vanillin, which consists in heating vanillin benzyl ether with hydrochloric acid, alcohol and water in a digester until complete decomposition occurs, then distilling off the alcohol and driving off the resulting benzyl-ethyl ether, and separating the vanillin from the residue, substantially as set forth.

In testimony whereof I affix my signature in presence of two witnesses.

FRITZ ACH.

Witnesses:
LORENZ ACH,
P. REHLÄNDER.